May 5, 1936. P. W. KOCH 2,039,599
REACTIONLESS VALVE
Original Filed April 6, 1932 2 Sheets-Sheet 1
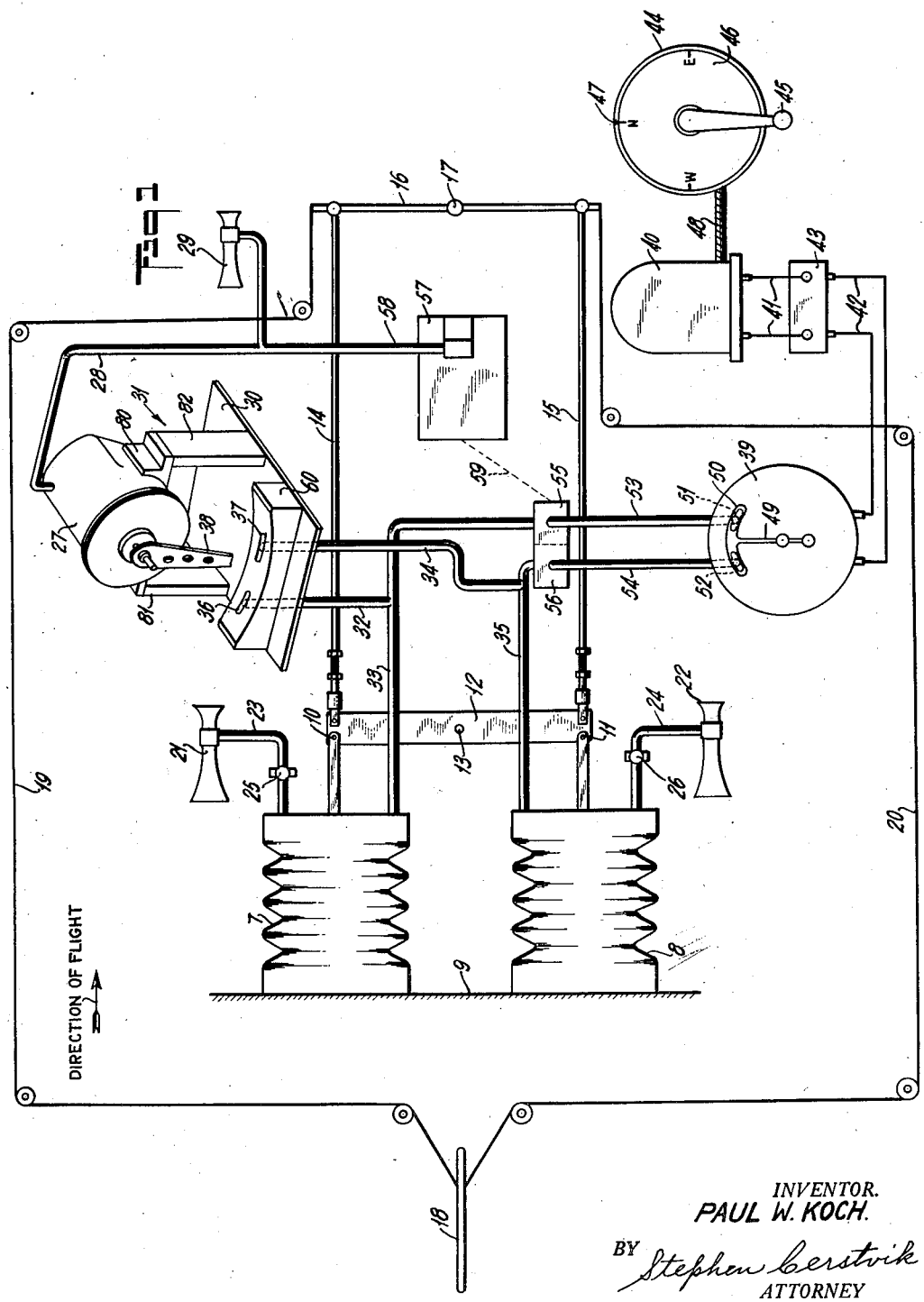
INVENTOR.
PAUL W. KOCH.
BY Stephen Cerstvik
ATTORNEY May 5, 1936.   P. W. KOCH   2,039,599
REACTIONLESS VALVE
Original Filed April 6, 1932   2 Sheets-Sheet 2
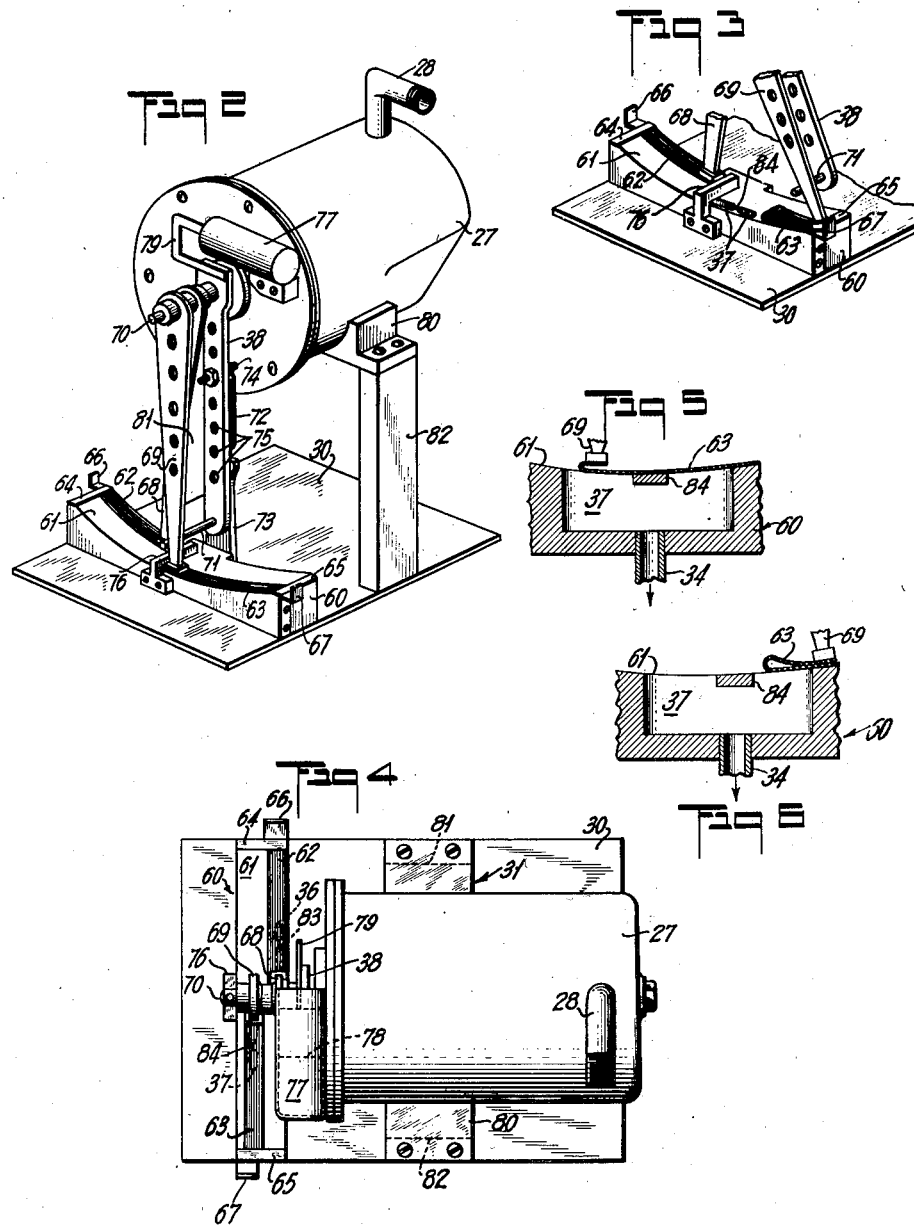
INVENTOR.
PAUL W. KOCH.
BY Stephen Gerstvik
ATTORNEY.

Patented May 5, 1936

2,039,599

UNITED STATES PATENT OFFICE 2,039,599

REACTIONLESS VALVE

Paul W. Koch, Brooklyn, N. Y., assignor to Bendix Aviation Corporation, South Bend, Ind., a corporation of Delaware Original application April 6, 1932, Serial No. 603,646. Divided and this application December 27, 1932, Serial No. 649,095

6 Claims. (Cl. 277—3)

The present invention relates to control devices and more particularly to devices adapted to be operated by fluid pressure for controlling servo-units of control systems such, for example, as aircraft stabilizing systems of the type disclosed in the co-pending application Serial No. 603,646 filed April 6, 1932, now Patent No. 1,932,330, issued Oct. 24, 1933, of which the present application is a division.

One of the objects of the invention is to provide a novel reactionless control device adapted for controlling a fluid pressure servo-unit in an aircraft stabilizing system.

Another object is to provide in an aircraft stabilizing system of the type embodying a fluid pressure motor for operating a control surface of an aircraft, means for controlling the servo-motor in response to a change of the attitude of the craft with respect to one of its axes, the combination with said controlling means, of a novel reactionless valve whereby upon operation of the valve by said controlling means no opposing forces are exerted back on the latter.

Another object of the invention is to provide a novel reactionless control device embodying an actuating member adapted for controlling a fluid pressure servo-unit whereby upon operation of the device no opposing forces are exerted back on the actuating member.

A further object is to provide a novel reactionless control device embodying a gyroscopic turn indicator for actuating the same for controlling a fluid pressure servo-unit whereby upon operation of the device by the turn indicator no opposing forces are exerted back on said turn indicator.

A still further object of the invention is to provide a novel reactionless valve for controlling fluid pressures by an actuating device and embodying a novel structure such that when the valve is operated by the actuating member, no opposing forces are exerted back on said member whereby the sensitivity of the valve is increased.

The above and other objects and advantages of the invention will appear more fully hereinafter from a consideration of the detailed description which follows, when taken in connection with the accompanying drawings wherein one embodiment of the invention is illustrated. It is to be expressly understood, however, that the drawings are for the purpose of illustration and description only and are not designed as a definition of the limits of the invention, reference being had for this purpose to the appended claims.

In the drawings wherein like reference characters refer to like parts throughout the several views;

Fig. 1 illustrates a schematic arrangement of an aircraft stabilizing system embodying one form of the novel reactionless control device of the present invention;

Fig. 2 is a perspective view of one form of the novel control device itself;

Fig. 3 is another perspective view, with parts broken away, illustrating in detail the novel reactionless valve with one set of ports open;

Fig. 4 is a top plan view of the device shown in Fig. 2; and

Figs. 5 and 6 are enlarged detail views showing the manner of operation of one of the flexible members which co-operates with its associated port showing how reaction is prevented or eliminated.

The invention contemplates the provision of a reactionless valve for controlling fluid pressures and adapted to be operated by a more or less sensitive actuating device and embodying a novel construction, whereby upon operation of the valve by the actuating device reaction forces on the actuating device are substantially eliminated or prevented. This is accomplished, in the illustrated embodiment of the invention, by the provision of flexible members in the form of strips of some suitable flexible material such, for example, as rubberized cloth, said strips being arranged normally to cover the ports of the valve and having one of their respective ends anchored to the valve and having their other ends connected to arms which are adapted to be operated by the actuating device.

Referring to the drawings, and more particularly to Fig. 1, there is shown a schematic arrangement of an aircraft directional stabilizing system embodying the novel reactionless control device of the invention and, in the form shown, said system comprises a fluid pressure operated servo-unit constituted by bellows 7 and 8 having one of their respective ends secured to a fixed support 9 carried by the craft to be stabilized. The other ends of said bellows are pivotally reconnected at 10 and 11, respectively, to a cross bar 12 which in turn is pivoted at 13. The cross bar 12 is connected by means of adjustable rods 14 and 15 to the usual rudder bar 16 pivoted at 17. The rudder bar 16 is adapted to control the rudder 18 of the aircraft by means of cables 19 and 20 and may be operated either manually by the pilot or automatically by the bellows 7 and 8 as will appear more fully hereinafter.

The fluid pressure for operating the bellows 7 and 8, in the present embodiment, is provided in the form of a suction created by means of Venturi tubes 21 and 22 connected to the bellows 7 and 8 by means of conduits or pipes 23 and 24, respectively, each of which is provided with an adjusting valve 25 and 26 for varying the suction in the bellows so that the force produced by said bellows on the cross bar 12 may be adjusted to a value such that the bellows may be overcontrolled by manual operation of the rudder bar 16. The bellows 7 and 8 are normally closed to the atmosphere and, consequently, by virtue of the suction produced therein by means of the Venturi tubes 21 and 22, said bellows tend to collapse, thereby exerting a pulling force on the ends of the cross bar 12. Since the suction in both bellows is equal, the forces exerted on the cross bar 12 are, therefore, equal and the latter remains stationary.

Means are now provided for controlling the bellows 7 and 8 in accordance with the rate of turn of the aircraft when the latter departs from a predetermined course, said course being selected by means of compass and compass-controller to be described later. In the form shown, the means for controlling the bellows in accordance with the rate of turn of the aircraft comprise the novel control device of the invention which is constituted by a gyroscopic turn indicator shown generally at 27, the rotor (not shown) of which is adapted to be operated by a suction produced within the casing of the instrument by means of the conduit 28 and a Venturi tube 29 connected thereto. The turn indicator is mounted on a platform 30 by means of a bracket 31 and is so arranged that upon actuation of the turn indicator by the turning of the craft to the left or right of the predetermined course it is adapted to open one or the other of the bellows 7 and 8 to the atmosphere. The novel reactionless valve of the invention is provided for this purpose and is connected to the bellows 7 and 8 by means of conduits 32, 33 and 34, 35, said conduits having connections with a pair of ports 36 and 37, respectively, one or the other of which is adapted to be uncovered, as will appear later, by means of an actuating member 38 operatively connected to a precessional frame (not shown) of the turn indicator 27. The ports 36 and 37 are, preferably, elongated in form so as to provide for variation in the opening thereof. When the actuating member 38 is normally inoperative, i. e., when no turns are taking place, both of the ports 36 and 37 remain completely covered so that the suction on both of the bellows 7 and 8 is equal and consequently the forces on the cross bar 12 are equal, the rudder 18 thus remaining in its central position. The amount of leakage through the ports 36 and 37 may be varied by varying the size of the openings to the ports by the movement of the arm 38 thereby causing the force produced by the bellows on the cross bar 12 to be a function of the rate of turn of the craft as determined by the turn indicator 27. Hence, the movement of the rudder 18, by either of the bellows 7 and 8, through the action of either of the ports 36 and 37, will be a function of the rate of turn, and in effect the operation of the turn indicator causes the force produced on the bellows to anticipate a turn of the craft by immediately acting on the rudder with a force equal to that produced by the turning of the craft.

The control of the rudder by only the turn indicator, however, is insufficient to maintain the craft on a predetermined and desired course, as pointed out in the co-pending application Serial No. 603,646 referred to above, since the turn indicator does not respond to the angle of turn or departure of the craft from its course and, therefore, means are provided for introducing a correction factor in the operation of the servo-unit, the bellows 7 and 8 in the present instance, which factor is a function of said angle of departure, by causing additional leaks from the respective bellows to be opened to the atmosphere in accordance with the value of said angle or the angular distance which the craft is off the course, thereby creating a force on the rudder by the bellows, which force is proportional to said angle of departure. As illustrated, said means comprise an electrical off-course indicator 39 which is constituted by a double reading galvanometer electrically connected to and energized by an electrolytic master compass 40 of the type disclosed in a co-pending application of Adolf Urfer, Serial No. 470,451 filed July 24, 1930, through leads 41 and 42 connected to a terminal block 43. The compass may be adjusted for a desired course by means of a compass controller shown at 44, by cranking a handle 45 thereof until the desired course is indicated on a compass card 46 carried by the controller, and by a reference mark or lubber's-line 47. The controller causes the compass bowl of the compass 40 to be rotated by means of a flexible shaft 48 to the position indicated on the compass card 46. The craft is then maneuvered until it is on the selected course at which time a pointer 49 of the off-course indicator 39 will be in its normally central or zero position. Upon a deviation of the craft to the left the pointer will move to the left, and when the craft deviates to the right the pointer will move to the right in proportion to the angle that the craft is off the course. In order to introduce this compass correction into the servo-unit, i. e., to the bellows 7 and 8, the pointer 49 is provided with a shield 50 of any suitable relatively flexible material such, for example, as celluloid and being formed as an arcuate member extending transversely of the pointer 49 and arranged to normally cover a pair of elongated orifices 51 and 52 provided in the face or dial of the indicator 39. The orifices are reconnected by means of conduits 53 and 54, respectively, and through valves 55 and 56, respectively, to the conduits 33 and 35, and hence to the bellows 7 and 8, whereby additional leakage of the bellows to the atmosphere takes place when the shield 50 moves to the left or right. Thus, upon a deviation of the craft to the left or right of a selected course, either one or the other of the bellows 7 and 8 are opened to the atmosphere by means of leaks controlled by the angle of departure and the rate of departure of the craft from the selected course and, consequently, such leakage to the atmosphere is a combined function of the angle plus the rate of departure so that the force created by the bellows on the cross bar 12, and hence the rudder bar 16 and rudder 18, is a function of the angle and the rate of such departure.

It has been found, however, that when either of the slots 51 and 52 is open, the shield 50 tends to stick against the face of the dial of the indicator due to the rush of air through said openings and the force of the galvanometer pointer 49 was insufficint to move the shield during such time. Means are, therefore, provided for periodically cutting off the suction in the pipes 53 and 54 leading to the indicator 39 so that the pointer is enabled to move the shield into the proper position with respect to the slots 51 and 52 in accordance with and corresponding to the position of the magnetic element of the master compass 40. Said means include the valves 55 and 56 and an automatically operated timing mechanism 57, which is actuated by fluid pressure or suction derived from the Venturi tube 29 through a branch pipe 58 for intermittently and periodically opening and closing said valves 55 and 56 by means of a connection indicated diagrammatically by a dotted line 59, whereby the suction to the indicator 39 is cut off and in this manner proper operation of the shield 50 is assured so that the slots 51 and 52 can be opened the correct amount to produce the desired effect on the bellows. This cutting off of the suction to the off-course indicator prevents oscillation of the pointer 49 due to the oscillation of the master-compass-card, thereby eliminating a tendency of the craft to yaw due to such oscillation. Since this automatic timing mechanism forms no part of the present invention, a description thereof is unnecessary.

Referring now to Figs. 2, 3 and 4, the novel valve of the present invention, which is operated by the turn indicator 27, is constituted by a block 60, having formed therein an arcuate track or runway 61 in which are provided the ports 36 and 37 through which the bellows 7 and 8 are adapted to be opened to the atmosphere. These ports or orifices are, as pointed out hereinbefore, preferably, elongated and are adapted to be normally held closed by means of strips 62 and 63 of suitable flexible material such, for example, as rubberized cloth, said strips having one of their ends secured to the block 60 at the ends of the runway or track in any suitable manner, as, for example, by means of metal strips 64 and 65 which have formed thereon projecting portions 66 and 67 serving as stops as will appear later. The other ends of the strips 62 and 63 are secured to arms 68 and 69, respectively, which are pivotally mounted on an extension or shaft 70 of the turn indicator shaft which is rotated clockwise or counter-clockwise by the indicator in accordance with the turns of the arms being to the left or to the right. One of these arms, namely, 68 is arranged to be moved to the left while the other arm 69 is arranged to be moved to the right by means of a pin 71 secured to the arm or lever 38. The arm 38 is maintained in its normally central position by means of a spring 72 which has one end thereof secured to a fixed support 73 and its other end secured to a pin or screw 74 carried by the arm 38 in one or another of a series of threaded holes 75 depending on the amount of tension it is desired to be exerted by the spring 72 for restoring the arm 38 to its normally central position after it has been actuated by the precession of the gyrorotor (not shown) which is within the casing of the indicator 27. A central stop 76 is provided midway between the extremities of the track 61, and is secured to the block 60 to prevent the arms 68 and 69 from exerting an abrupt pull on the rubberized strips 62 and 63 when the arm returns to its normal position, thereby preventing rapid destruction and deterioration of the strips. Means are also provided for preventing oscillation of the lever 38, due to vibration, acceleration or other disturbing forces and, in the form shown, said means comprise a dash pot 77 having a piston 78 therein (Fig. 4) which is connected to the lever 38 by means of a U-shaped bracket 79 (Fig. 2). The turn indicator 27 is supported by the bracket 31 which is constituted by a shelf 80 carried by a pair of upright members 81 and 82 secured to the platform 30 on which is also carried the block 60.

In order to prevent the strips 62 and 63 from being sucked into the ports completely, each port is provided with a bridging strip 83 and 84, respectively, on which the strips are supported when the ports are closed.

It will be seen, particularly with reference to Fig. 3, that when the arm 38 moves to the right, the pin 71 causes the arm 69 to be moved to the right thereby removing the strip 63 from the port 37 and the arm is prevented by the stop 67 from being carried off the track or runway 61. In like manner, if the arm 38 moves to the left pin 71 moves arm 68 to the left thereby lifting the strip 62 from the port 36. Since the ports 36 and 37 are connected to a source of suction, the atmospheric pressure forces the strips towards the slots constituting the ports and effects a tight seal. The air rushing in through the ports 36 and 37, when the strips are actuated, tends to equalize the pressure near the stripportion which is opening the port and, therefore, by properly dimensioning the ports and strips, a novel control valve is produced which does not exert any force back on to the respective control arms 68 and 69, and thus is reactionless with respect to said arms.

Referring particularly to Figs. 5 and 6 it will be seen that if a small force is produced by the gyroscope 27 on the arm 38, thereby pulling the strip to one side to form a loop, the associated aperture or port is open only slightly, at which time the air rushing into the port equalizes the suction at the loop portion of the strip so that practically no force is needed to open the port further by moving the flexible strip more to the right, for example, as shown in Fig. 6. The pressure on both sides of the strip will always be substantially equalized near the loop portion thereof, while the suction increases towards the end of the slot which is still covered. The advantage of this novel structure is that the turn indicator is made effective to control the bellows for even very slight rates of turn thus making the steering system more sensitive and accurate in controlling the craft which is steered thereby; further, the valve changes the suction gradually, is substantially free from reaction and, due to the suction, always closes the ports tightly so that when they are closed, substantially no air is permitted to pass therethrough. The structure of the valve is such that a critical adjustment thereof is not necessary, is inexpensive to manufacture and tests indicate that a force less than a half of a gram produced by the turn indicator can overcome a suction in the ports of substantially six or seven inches of mercury, or approximately three pounds per square inch.

There is thus provided a novel reactionless control device particularly adapted for use in controlling a servo-unit of an aircraft stabilizing system, although it will be apparent to those skilled in the art that the novel valve may be employed to control fluid pressure for any apparatus in which a sensitive control is required by a relatively small force produced by the actuating member of the valve. Therefore, although in the embodiment illustrated, the valve is shown as operated by a turn indicator, it is to be expressly understood that other types of controlling device may be employed depending upon the purpose for which the fluid pressure is to be controlled.

Only one embodiment of the invention and its application for a particular purpose has been illustrated and described but it is to be understood that various changes and modifications which will now appear to those skilled in the art, may be made without departing from the scope of the invention. Reference is, therefore, to be had to the appended claims for a definition of the limits of the invention.

What is claimed is:

1. A reactionless two-way valve mechanism for controlling fluid pressures, comprising a member having substantially elongated ports adapted to be connected to apparatus to be controlled by the fluid pressures, a strip of flexible material for each of said ports for respectively covering the same whereby an air-tight seal is formed, one end of each of said strips being secured to the member and the other end of one of said strips being adapted to be moved in one direction and the other end of the other of said strips being adapted to be moved in the opposite direction to uncover the respective ports and in such a manner that the movement of said ends forms a loop in the strip whereby the pressures on both sides of the strip are equalized so that substantially little additional effort is required to further uncover the ports and reaction forces are eliminated, means for moving the ends of said strips one at a time in opposite directions whereby only one port is uncovered at a time and the other remains covered at that time, and means opposing the movement of said last-mentioned means in either direction whereby the ports are again closed by their respective strips.

2. A reactionless two-way valve mechanism for controlling fluid pressures, comprising a member having a substantially curved surface forming a runway and having ports opening in said runway, a strip of flexible material for each of said ports for covering the same whereby an air-tight seal is formed, one end of each strip being secured to the member and the other ends of said strips being free to be moved in respectively opposite directions, a pair of arms pivoted at a common point and connected to the free ends of the respective strips and adapted to move said strips in opposite directions to uncover the respective ports and in such a manner that the movement of the free ends of the strips forms a loop therein with the concave side of the loop adjacent the uncovered portion of the port whereby the pressures on both sides of the strip are equalized so that substantially little additional effort is required to further uncover the ports and reaction forces are eliminated, means for moving said arms one at a time in opposite directions about their pivots whereby only one port is uncovered at a time and the other remains covered at that time, and means opposing the movement of said last-mentioned means in either direction whereby the ports are again closed by their respective strips.

3. A reactionless two-way valve mechanism for controlling fluid pressures, comprising a member having ports adapted for connection to apparatus to be controlled by the fluid pressure, a flexible member for each of said ports and cooperating therewith to close the same and form an air-tight seal, said flexible members being arranged to be bent back on themselves in respectively opposite directions whereby pressures on both sides thereof are equalized and reaction forces eliminated, means for moving said flexible members one at a time in respectively opposite directions and back on themselves to uncover their respective ports one at a time whereby the other of said ports remains covered at that time, and means opposing the movement of said last-mentioned means in either direction whereby the ports are again covered by their respective strips.

4. A reactionless two-way valve mechanism for controlling fluid pressures, comprising a member having ports adapted for connection to apparatus to be controlled by the fluid pressure, a flexible member for each of said ports and cooperating therewith to close the same and form an air-tight seal, said flexible members being arranged to be bent back on themselves in respectively opposite directions away from each other whereby pressures on both sides of said strips are equalized and reaction forces eliminated, means for moving said flexible members one at a time in respectively opposite directions and back on themselves to uncover their respective ports one at a time whereby the other of said ports remains covered at that time, and resilient means opposing the movement of said last-mentioned means in either direction whereby the ports are again covered by their respective strips.

5. A reactionless two-way valve mechanism for controlling fluid pressures, comprising a member having ports adapted for connection to apparatus to be controlled by said fluid pressures, a strip of flexible material for each of said ports and cooperating therewith to cover the same, means for moving, one at a time, one end of one of said flexible members in one direction and one end of the other of said members in an opposite direction to uncover said ports one at a time whereby the other of said ports remains covered at that time, and means opposing the movement of said last-mentioned means in either direction whereby said ports are again covered by their respective strips.

6. A reactionless two-way valve mechanism for controlling fluid pressures, comprising a member having ports adapted for connection to apparatus to be controlled by said fluid pressures, a strip of flexible material for each of said ports and cooperating therewith to cover the same, means for moving, one at a time, one end of one of said flexible members in one direction and one end of the other of said members in an opposite direction to uncover said ports one at a time whereby the other of said ports remains covered at that time, and resilient means opposing the movement of said last-mentioned means in either direction whereby said ports are again covered by said strips.

PAUL W. KOCH.